Patented Feb. 12, 1929.

1,701,986

UNITED STATES PATENT OFFICE.

KURT RIPPER, OF VIENNA, AUSTRIA, ASSIGNOR TO FRITZ POLLAK, OF VIENNA, AUSTRIA.

PROCESS FOR THE MANUFACTURE OF MOLDED ARTIFICIAL MASSES BY REMOVING THE LIQUID MEDIUM FROM EMULSION COLLOIDS.

No Drawing. Application filed May 20, 1924, Serial No. 714,740, and in Austria June 22, 1923.

My invention relates to the manufacture of molded articles by removing the liquid medium from emulsion colloids of all kinds, and especially from the emulsion colloid obtained by the reaction of formaldehyde on a urea. The liquid components retained with great tenacity by solutions of emulsion colloids or by coagels cannot be expelled therefrom by the usual evaporating or freezing methods to a sufficient degree to allow the resulting dry colloids to form good molded articles. This is the reason why it has not been hitherto possible to produce on an industrial scale hard plates, blocks, rods, and the like of large dimensions from dissolved emulsion colloids. When highly concentrated solutions to be deprived of their liquid components are poured into molds, the said solutions soon become a gel-like mass from the surface of which, liquid gradually exudes, but the portion below the surface remains moist and under certain circumstances may remain so after being heated for a period of several months. This behaviour may probably be attributed to the circumstance that certain capillary forces form a hindrance of evaporation of the separated liquid in the narrow air channels between the gel-like mass and the walls of the mold. A further and assuredly certain reason is that the high temperature to which the material is subjected for the purpose of expelling the liquid increases the soaking and peptising action of the separated liquid medium.

Now I have found that all the disadvantages mentioned in the foregoing are obviated in that the liquid medium is removed from emulsion colloids or coagels by using molds which are permeable to the said medium but impermeable to the colloid.

Molds suitable for carrying into practice the process according to the invention may for example be made of porous material such as clay, wood, cardboard or porous metals, thereafter coated with a membrane which is permeable only to the liquid to be removed. To this end also a coarse porous or comparatively openwork support may be used (such as for example a textile) provided that the said support (the surface of which may be roughened for the purpose) affords a firm hold to the membraneous coating it is intended to carry. Finally the membrane may be used to form a mold without support, if made of sufficient thickness. As an example, the known cellulose ester lacquer may be used as membrane when water is to be removed according to the present process from colloidal solutions. In a similar manner alcohol or benzol may be removed with the aid of silica gels.

Perfectly homogeneous molded articles of any desired dimensions may be produced within a comparatively short period of time by pouring the emulsoids into molds of the kind described and if necessary applying heat thereafter. It is a surprising fact that the time of hardening of the material is practically independent of the size of the article; very large molded pieces did not harden at any considerably slower rate than that of small flat pieces. This circumstance is of no little importance as regards the production of artificial materials on an industrial scale. The term gel-mass, is hereinafter employed in its broader significance to embrace jellies and coagels.

*Examples.*

(1.) The manufacture of molded articles, to be made for instance from the partially evaporated highly viscous condensation products of the reaction between urea and formaldehyde, may successfully be carried out in the following manner: A mold, made of burnt clay, is impregnated with a solution of a lacquer made from cellulose-esters, and into the mold thus impregnated the viscous condensation product is poured. After a short time, during which heat may be applied or not, gelatinization of the emulsoid takes place, and thereafter the evaporation of the water will proceed in a most uniform manner, so that within a relatively very short time molded pieces of solid urea-formaldehyde products are obtained, which pieces may be of any convenient dimensions and which are perfectly free of fissures, cracks or the like.

(2.) Instead of using the clay-mold impregnated with lacquer of cellulose-esters, as mentioned in Example 1, the mold itself may entirely be made of cellulose-esters and it will work just as satisfactorily as the first named mold.

I claim:

1. A process for removing water from the emulsion colloid obtained by the reaction of formaldehyde on a urea consisting in that the partially evaporated viscous condensation product is allowed to dry in molds permeable to water and impermeable to the disperse phase.

2. A process for removing water from the emulsion colloid obtained by the reaction of formaldehyde on a urea consisting in that the partially evaporated viscous condensation product is allowed to dry by applying heat in molds permeable to water and impermeable to the disperse phase.

3. The process of forming shaped artificial masses from urea-formaldehyde condensation products, which comprises allowing the drying of the emulsion colloids obtained by the condensation of urea and formaldehyde to proceed in molds, the walls of which comprise a membrane which is permeable only for the solvent by impermeable to the colloid substances therein contained.

4. The process of forming shaped artificial masses from urea-formaldehyde condensation products which comprises drying the emulsion colloids obtained by the condensation of urea and formaldehyde by heat in molds, the walls of which comprise a membrane which is permeable to the solvent but impermeable to the colloid substances therein contained.

5. The process of forming shaped artificial masses from emulsion colloids containing urea-formaldehyde condensation products, which comprises partially drying the same before placing in a mold up to the state of a gel-mass, then further drying the latter in molds, the walls of which comprise a membrane which is permeable only for the solvent and on the other hand impermeable to the colloid substances therein contained.

6. The process of forming shaped artificial masses from emulsion colloids containing urea-formaldehyde condensation products, which comprises causing the aqueous liquid containing such condensation product to set as a coagel and drying the latter in molds, the walls of which comprise membrane permeable only for the solvent and on the other hand impermeable to the colloid substances therein contained.

7. A process which comprises treating an aqueous material containing the colloidal reaction product of urea and formaldehyde which comprises placing same in a porous mold impregnated with cellulose ester lacquer, and drying the same therein.

8. A process which comprises drying a gel-mass prepared by causing the setting of an aqueous liquid containing a condensation product of urea and formaldehyde, in a mold which is formed in part at least, of a cellulose ester.

9. A process which comprises placing a gel-mass in a porous mold impregnated with a cellulose ester lacquer and thereafter evaporating water from the exterior surface of said mold.

10. A process which comprises placing an emulsoid which by removal of a fraction of its contained liquid phase becomes converted into a jelly-like mass, in a porous mold impregnated with a cellulose ester lacquer.

11. A process which comprises drying a colloid comprising urea-formaldehyde resin, in a mold composed, in part at least, of a cellulose ester.

In testimony whereof I have affixed my signature.

KURT RIPPER.